United States Patent
Zimmer et al.

(10) Patent No.: US 7,107,388 B2
(45) Date of Patent: Sep. 12, 2006

(54) METHOD FOR READ ONCE MEMORY

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 10/424,084

(22) Filed: Apr. 25, 2003

(65) Prior Publication Data

US 2004/0215908 A1    Oct. 28, 2004

(51) Int. Cl.
G00F 12/00 (2006.01)
G00F 12/14 (2006.01)

(52) U.S. Cl. ............. 711/103; 711/163
(58) Field of Classification Search ........... 711/103, 711/163, 164
See application file for complete search history.

(56) References Cited

U.S. PATENT DOCUMENTS

| | | | | |
|---|---|---|---|---|
| 6,188,602 B1* | 2/2001 | Alexander et al. | ..... | 365/185.04 |
| 6,480,097 B1* | 11/2002 | Zinsky et al. | ..... | 340/5.8 |
| 6,505,278 B1* | 1/2003 | Piwonka et al. | ..... | 711/162 |
| 6,633,964 B1* | 10/2003 | Zimmer et al. | ..... | 711/163 |
| 6,829,672 B1* | 12/2004 | Deng et al. | ..... | 711/103 |
| 2003/0028766 A1* | 2/2003 | Gass et al. | ..... | 713/164 |
| 2003/0225955 A1* | 12/2003 | Feldstein et al. | ..... | 710/306 |
| 2004/0034765 A1* | 2/2004 | James | ..... | 713/1 |

* cited by examiner

*Primary Examiner*—Woo H. Choi
(74) *Attorney, Agent, or Firm*—Steven P. Skabrat

(57) ABSTRACT

Flash memory in a computing system having blocks that may be read only once per machine reset may be implemented by mapping the flash memory to an address space of the computing system, copying a selected block of at least one of instructions and data from a first region in the flash memory to a second region in a memory of the computing system, at least one of executing the instructions and accessing the data from the second region, unmapping the selected block of flash memory, and overwriting the second region. Subsequent attempts to access the selected block without performing a machine reset will fail. The selected blocks may be used to store secret instructions and/or data.

17 Claims, 6 Drawing Sheets

METHOD FOR READ ONCE MEMORY

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates generally to the field of computer systems. More particularly, the present invention relates to memory management of flash memory storing Basic Input/Output System (BIOS) instructions and/or data. Specifically, the present invention relates to a method for reading a portion of flash memory only once per system initialization.

BACKGROUND

A flash memory is a popular form of nonvolatile memory that can be erased and reprogrammed in units of memory called blocks. A common use for flash memory is to store the BIOS for a computing system. The BIOS is the essential system code or instructions used to control system configuration and to load the operating system for the computing system. In particular, BIOS provides the first instructions that a computing system executes when it is first turned on. The region of BIOS that is executed when a computing system is first turned on is referred to as a "recovery BIOS" region. The recovery BIOS region stores recovery or reset code that sets forth how the computing system is to be booted each time the computing system is first turned on. Because this region of BIOS is critical to the computing system, protection of the integrity of the BIOS is essential.

Hence, a computing system should protect the security and integrity of the recovery BIOS region in flash memory. As such, the recovery BIOS region is typically hardware protected (e.g., by a user setting a pin via a jumper cable). In current computing architectures, this region is limited to the first block (e.g., the "boot block") of the flash memory. This is typically limited to 64 Kbytes of memory and is the largest block size prescribed by current flash memory technologies. Thus, today only the first block can be hardware protected.

It may be desirable, however, to restrict access by operating systems or application programs to other areas of the flash memory once the computing system has been initialized. For example, secret information and/or instructions may be stored in certain blocks of the flash memory. This secret information and/or instructions may be used by the computing system for security operations, such as public and/or shared key cryptographic processing, copy protection schemes, and so on. If the secret information and/or instructions may be accessed after system initialization, then the information and/or instructions may be vulnerable to unauthorized access by hackers, viruses, etc. Currently, there is no way to prevent software attacks on these portions of flash memory. Therefore, there is a need to deter access to selected blocks of flash memory after system initialization processing is complete.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and system using a virtual lock for blocks in flash memory are described. In one embodiment, code and/or data from at least one selected block of a flash memory is executed or accessed, respectively, after or as part of initialization of a computing system. In one embodiment, the code and/or data may be used for cryptographic or security operations for the computing system. The block is then hardware protected such that further attempts to read the block are not allowed during subsequent processing by the system. Only a new system initialization/machine reset will allow reading of the block again. However, only the processing occurring during system initialization will be able to access the selected block prior to it being locked. One or more blocks in the flash memory may be locked based on the executed code such that the blocks are virtually hardware locked. The blocks can be virtually hardware locked using a programmable technique.

By allowing blocks of flash memory to be virtually hardware locked, a computing system can ensure hardware protection of "secret" code and/or data in a block of flash memory other than a boot block of the flash. This allows the computing system to deter access to the secret code and/or data by other programs after system initialization processing is complete. The flash memory locking techniques described herein offer protection for selected blocks of flash memory to deter hacking and/or virus activity. The flash memory locking techniques described herein also combine software techniques and existing hardware techniques in order to maintain a platform view of selected blocks of flash memory as "locked."

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
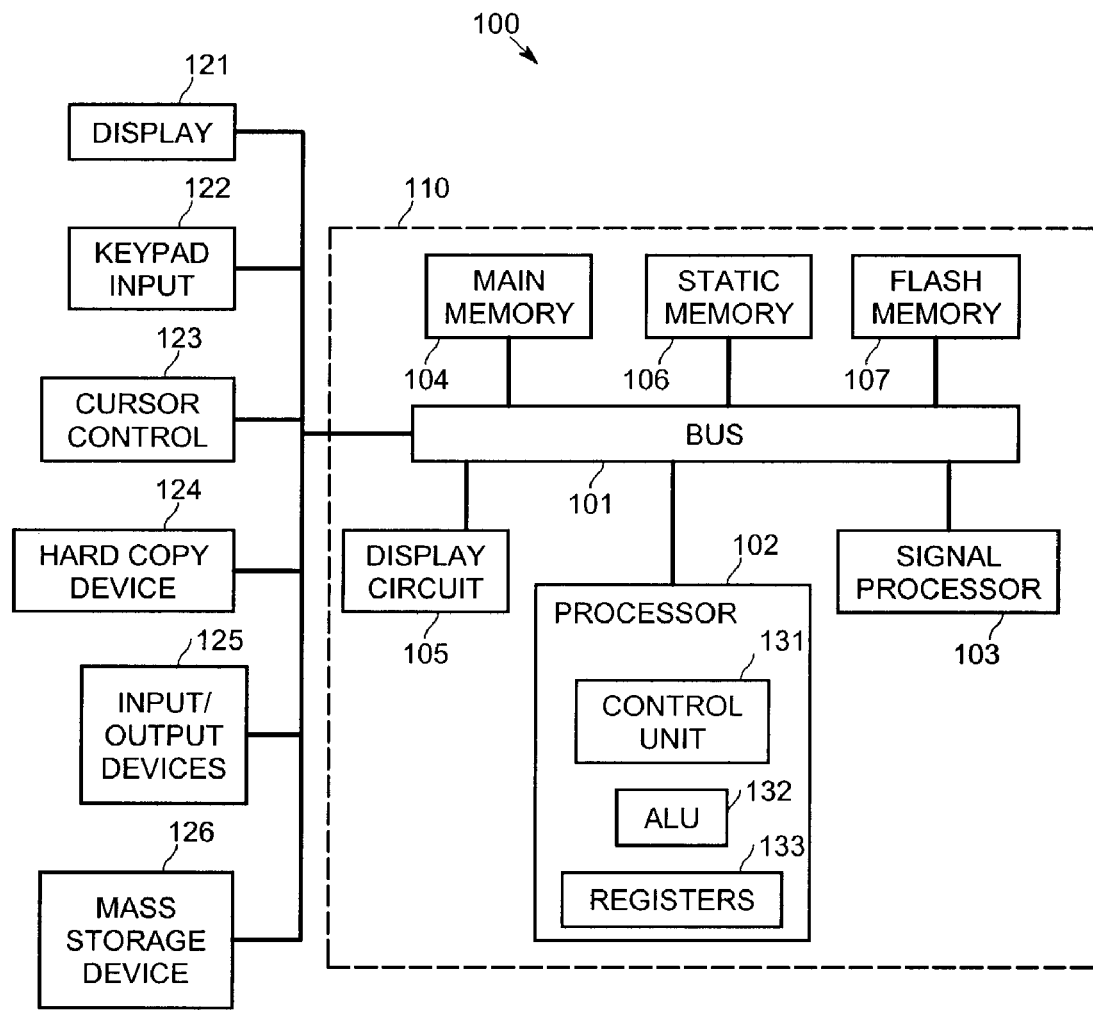
FIG. 1 illustrates an exemplary computing system in which embodiments of the present invention may be implemented.

FIG. 1 illustrates an exemplary computing system 100 in which the present invention can be implemented. The memory locking techniques described herein for BIOS or other code and/or data can be implemented and utilized within computing system 100, which can represent a general purpose computer system (e.g., a personal computer (PC)), portable computer system, hand-held electronic device, or other computing device. The components of computing system 100 are exemplary in nature in which one or more components can be omitted or added. For example, one or more input/output (I/O) devices or memory devices (not shown) can be added to computing device 100.

Referring to FIG. 1, computing system 100 includes a main unit 110 having a processor 102 and a signal processor 103 coupled to a display circuit 105, main memory 104, static memory 106, and flash memory 107 via bus 101. Signal processor 103 may operate as a co-processor with processor 102. Signal processor 103 may be an optional processing unit within computing system 100. Main unit 110 of computing system 100 can also be coupled to a display 121, keypad input 122, cursor control 123, hard copy device 124, input/output (I/O) devices 125, and mass storage device 126 via bus 101.

Bus 101 comprises a standard system bus for communicating information and signals. Processor 102 and/or signal processor 103 are processing units for computing system 100. Processor 102 or signal processor 103 or both can be used to process information and/or signals for computing system 100. Processor 102 may be used to process code or instructions to perform the memory locking techniques described herein. Alternatively, signal processor 103 can be used to process code or instructions to perform the memory locking techniques described herein. Processor 102 includes a control unit 131, an arithmetic logic unit (ALU) 132, and several registers 133, which can be used by CPU 102 to process information and/or signals and to perform the memory locking techniques described herein. Signal processor 103 can also include similar components as processor 102.

Main memory 104 may be, e.g., a random access memory (RAM) or some other dynamic storage device, for storing information or instructions (program code), which are used by processor 102 or signal processor 103. For example, main memory 104 may be used to store operating system software. Main memory 104 may also store temporary variables or other intermediate information during execution of instructions by processor 102 or signal processor 103. Static memory 106, may be, e.g., a read only memory (ROM) and/or other static storage devices, for storing information or instructions, which can also be used by processor 102 or signal processor 103.

Flash memory 107 comprises a nonvolatile memory device that can be erased and reprogrammed in units of memory called blocks. In one embodiment, flash memory 107 stores BIOS code or instructions for computing system 100. As will be explained in further detail below in connection with the following embodiments, one or more selected blocks may be protected such that the code and/or data stored in those regions cannot be read or changed after a certain time during system initialization processing.

Display 121 may be, e.g., a cathode ray tube (CRT) or liquid crystal display (LCD). Display 121 may display information or graphics to a user. Computing system 101 may interface with display 121 via display circuit 105. Keypad input 122 comprises an alphanumeric input device for communicating information and command selections to computing system 100. Cursor control 123 may be, e.g., a mouse, a trackball, or cursor direction keys, for controlling movement of an object on display 121. Hard copy device 124 may be, e.g., a laser printer, for printing information on paper, film, or some other like device. Input/output (I/O) devices 125 may represent any number of I/O devices that can be coupled computing system 100. For example, a digital camera may be coupled to computing system 100 as an I/O device. Mass storage device 126 may be a storage device such as a read/writable compact disc (CD) or digital video disk (DVD) drive.

The memory locking techniques described herein may be implemented by hardware and/or software contained within computing system 100. For example, CPU 102 can execute BIOS code in flash memory 107 to lock virtually selected blocks such that they are virtually hardware protected. Alternatively, processor 102 can execute code in another memory device or machine-readable medium to lock selected blocks in flash memory 107. Such a machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier wave signals, infrared signals, digital signals, and by other like signals.

Figure 2:
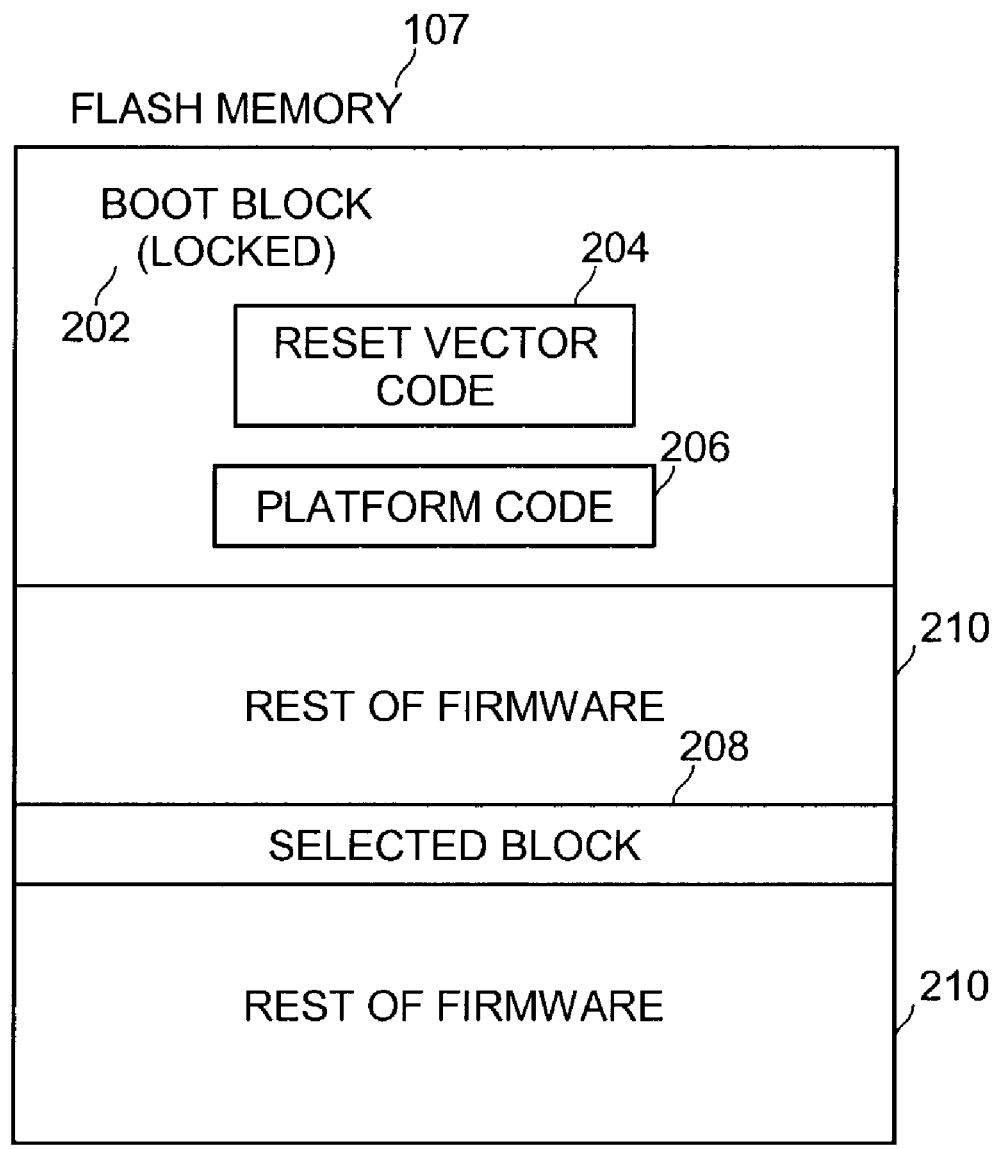
FIG. 2 illustrates a block diagram of a flash memory having blocks that are virtually hardware locked according to an embodiment of the present invention.

FIG. 2 illustrates a block diagram of flash memory 107 having at least one selected block 208 that is virtually hardware locked according to one embodiment. In one embodiment, flash memory 107 may be a flash memory device commercially available from Intel Corporation that can store BIOS or other code and/or data used by the Intel® family of microprocessor architectures. For example, flash memory 107 can be included within a firmware hub (FWH) commercially available from Intel Corporation.

As part of a FWH, an integrated command user interface (CUI) (not shown) may be provided for flash memory 107 to request access to locking, programming, and erase options. FWH provides a series of registers used for software read and write locking features. As will be described in further detail below, the CUI may be used to lock programmatically selected one or more blocks 208 of flash memory 107 using block locking register 250 shown in FIG. 3. Thus, selected one or more blocks 208 can be virtually hardware protected within computing system 100.

Referring to FIG. 2, flash memory 107 includes a boot block (hardware locked) that stores recovery BIOS for computing system 100. Flash memory 107 also includes the rest of the firmware 210, which stores main sections of BIOS or other code and/or data. In one embodiment, the BIOS stored in flash memory 107 may be compressed or partially compressed. The rest of the firmware 210 may comprise many blocks.

In one embodiment, boot block 202 includes reset vector code 204 and platform code 206 that are executed when computing system 100 is first turned on. Flash memory 107 can be pre-configured or programmed with reset vector code 204 and platform code 206. In one embodiment, processor 102 executes the instructions in reset vector code 204 and platform code 206 for computing system 100.

Reset vector code 204 provides initial instructions to load the BIOS for computing system 100. In one embodiment, reset vector code 204 passes control to platform code 206. Platform code 206 may provide instructions to lock selected one or more blocks 208 of flash memory 107 using a programming technique. By executing platform code 206, computing system 100 may, in one embodiment, guarantee a chain of trust to ensure the protection and integrity of selected one or more blocks 208. In one embodiment, secret code and/or data may be stored in selected block 208 for use during system initialization. Although shown somewhat in the middle of the flash memory of FIG. 2, the selected one or more blocks to be locked may be in any location or region of flash memory.

Figure 3:
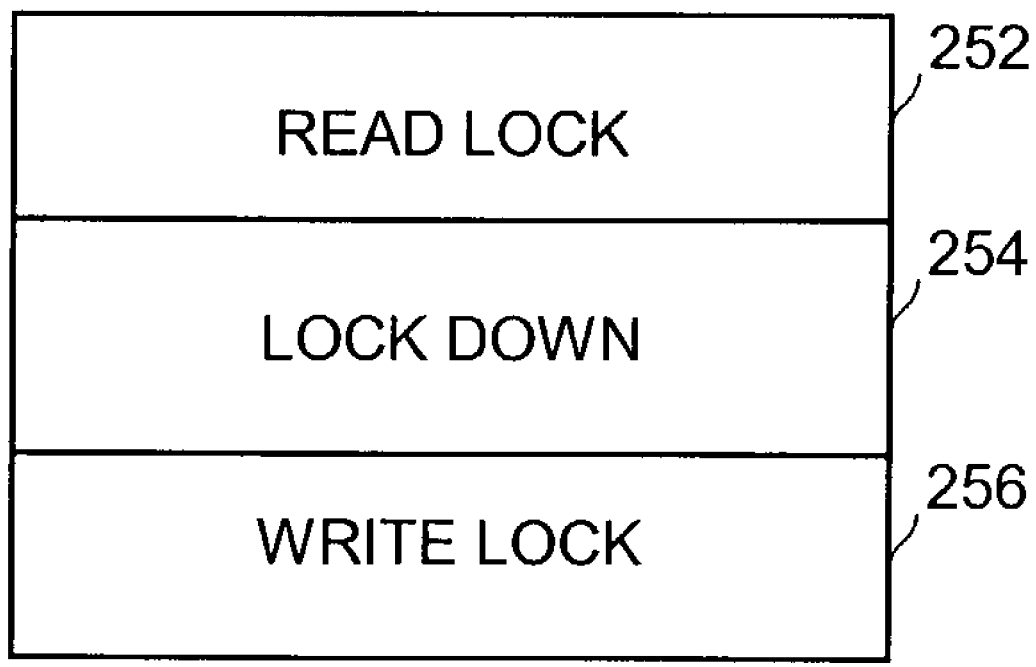
FIG. 3 illustrates a block diagram of a block locking register for the flash memory of FIG. 2 according to one embodiment.

FIG. 3 illustrates a block diagram of a block locking register 250 for flash memory 107 of FIG. 2 according to one embodiment. In one embodiment, block locking register 250 is part of an Intel Corporation FWH to lock flash memory 107. Block locking register 250 may represent a block locking register for each block of flash memory 107. Referring to FIG. 3, block locking register 250 includes a read lock bit 252, lock down bit 254, and write lock bit 256. The read lock bit 252 may be set to prevent read operations of the block when set. The lock down bit 254 may be set to prevent further set or clear operations to write lock bit 256 or read lock bit 252. The write lock bit 256 may be set to prevent normal program or erase operations in the block where set.

Figure 4:
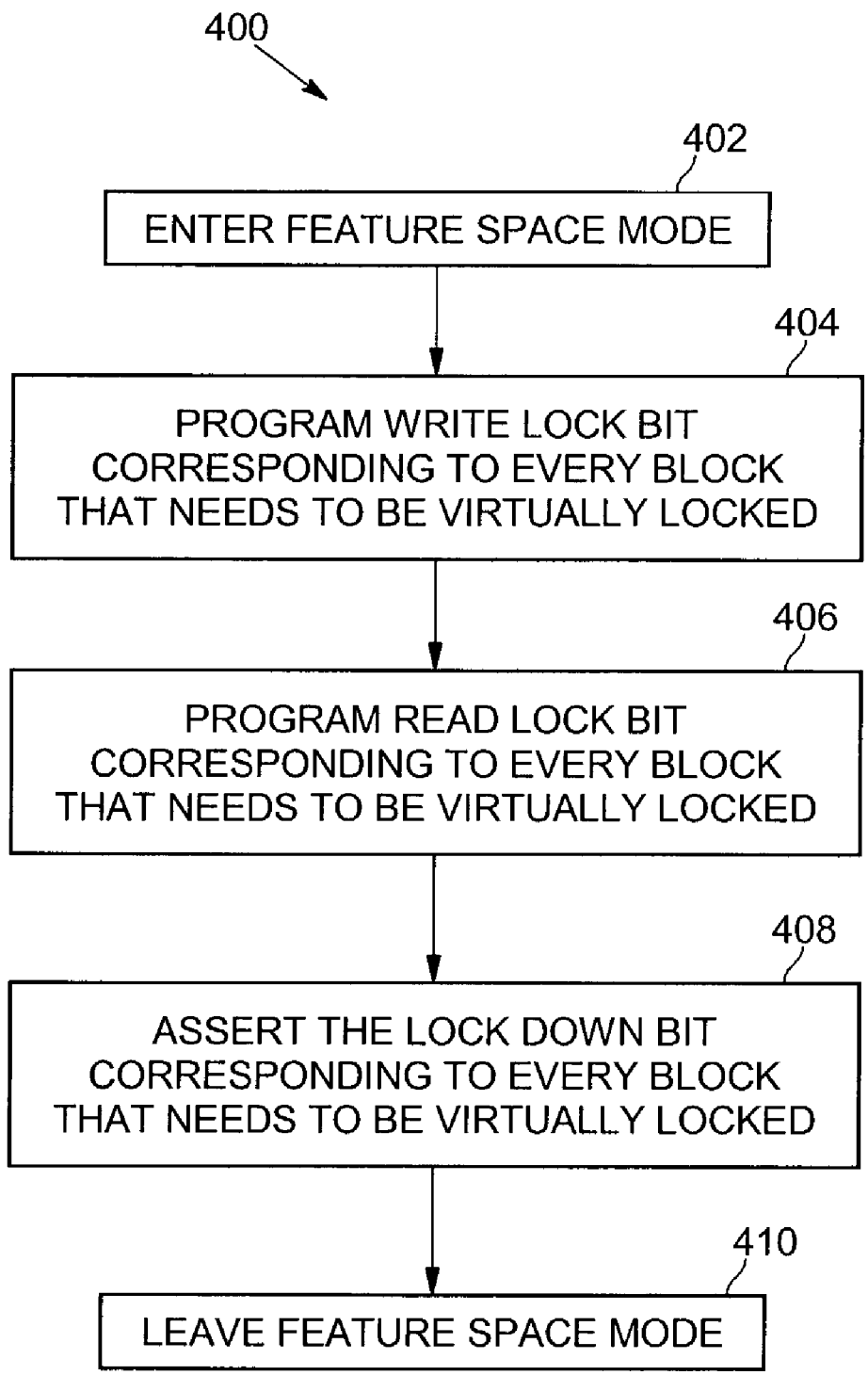
FIG. 4 illustrates a flow diagram of processing for locking blocks of flash memory according to an embodiment of the present invention.

FIG. 4 illustrates a detailed flow diagram of an operation 400 programming block locking register 250 in flash memory 107 to lock selected blocks 208 in a flash memory according to one embodiment. Initially, operation 400 begins at operation 402.

At operation 402, a "feature space mode" is entered from the CUI. For example, the CUI provides a set of commands, which include "read," "block erase," "read status," "open feature space," and other commands as part of the FWH.

In one embodiment, the feature space mode may be entered into by executing the open feature space command. In one embodiment, flash memory 107 offers register based locking at a block level in the feature space mode by using block locking register 250. In one embodiment, for each block, a block locking register 250 may be programmed to lock the block. In the feature space mode, a block locking register 250 may be programmed to lock a selected block of flash memory 107. By programming block locking register 250, selected one or more blocks 208 can be virtually hardware locked.

At operation 404, the write lock bit 256 is set ("programmed") in block locking register 250 corresponding to each block that needs to be virtually locked. The write lock bit 256, if set, disables writes to the associated block in flash memory 107. At operation 406, the read lock bit 252 is set ("programmed") in block locking register 250 corresponding to each block that needs to be virtually locked. The read lock bit 252, if set, disables reads of the associated block in flash memory 107.

At operation 408, the lock down bit 254 in the block locking register corresponding to every block that needs to be virtually locked is set or programmed. If set, the lock down bit 254 is critical for "virtual locking." For instance, if the lock down bit 254 is set, and the read lock bit 252 and write lock bit 256 are already set, the bits cannot be read or changed until computing system 100 is restarted.

Virtual locking can thus be performed by being done early in a boot process such that reads and/or writes cannot subsequently be performed to blocks falling under "virtual lock" until the computing system is restarted. Furthermore, if the lock down bit 254 is not set, computing system 100 can remove read and write locks previously set by read lock bit 252 and write lock bit 256 by entering feature space mode again, possibly at the direction of an application program.

This activity may be prevented by setting the lock down bit at the appropriate time during system initialization processing.

At operation 410, feature space mode is exited. In one embodiment, the operation of 400 may be initiated by platform code 206 within boot block 206 of flash memory 107.

Figure 5:
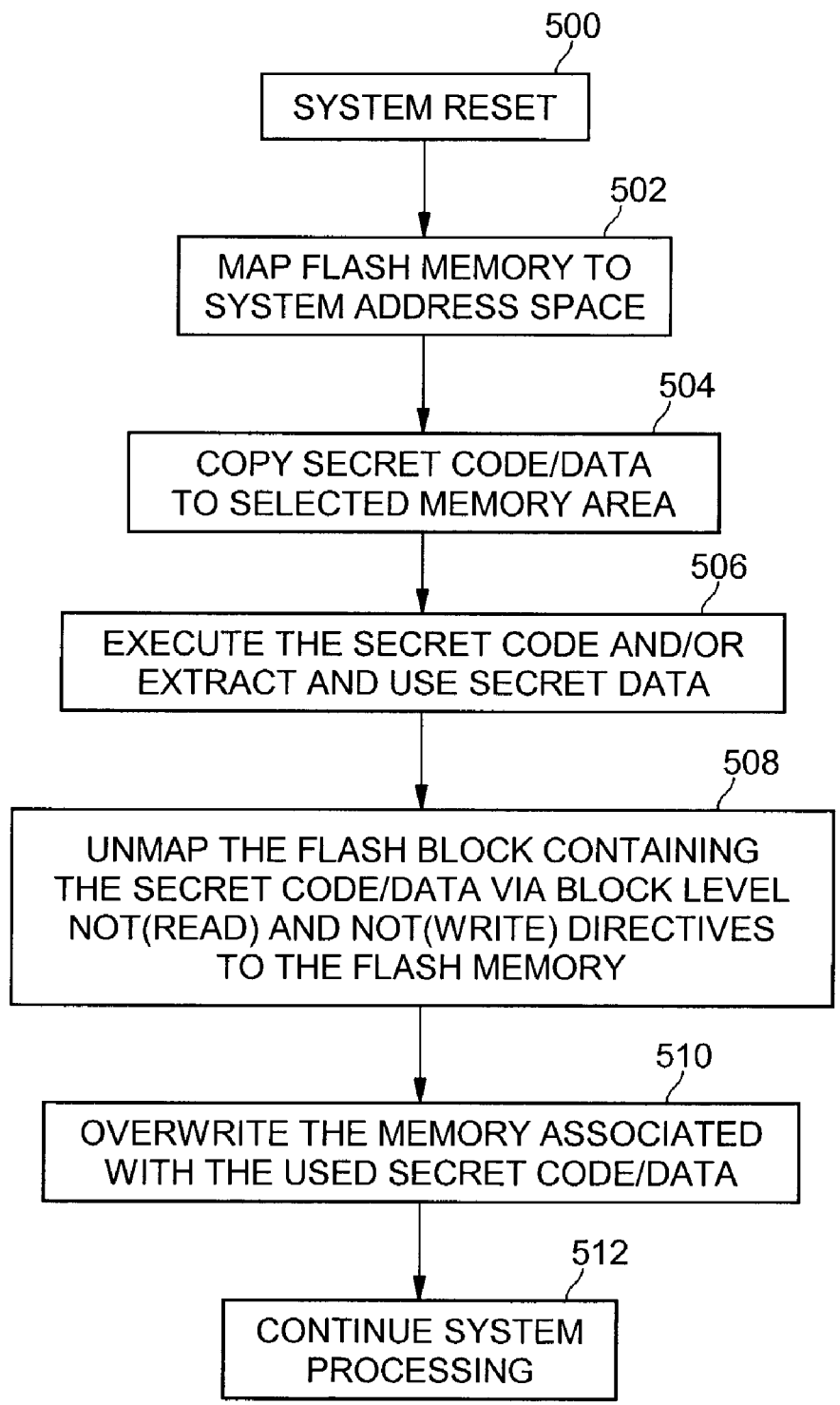
FIG. 5 illustrates a flow diagram of processing for allowing reading of blocks in a flash memory only once per system initialization according to an embodiment of the present invention.

FIG. 5 illustrates a flow diagram of processing for allowing reading of blocks in a flash memory only once per system initialization according to an embodiment of the present invention. At operation 500, a computing system may be reset. Boot block 202 receives a reset vector from processor 102 (e.g., during a boot process) that initiates reset vector code 202. Processor 102 executes instructions in reset vector code 202 to load BIOS for computing system 100. Processor 102 also executes platform code 206. In one embodiment, platform code 206 embodies a platform policy decision, which may be hard-coded in the BIOS at build-time or calculated by a run-time decision process to determine a selected one or more blocks 208 to lock "virtually" using a programmable technique. In one embodiment, the code operating as described in FIG. 5 may be trusted.

Figure 6:
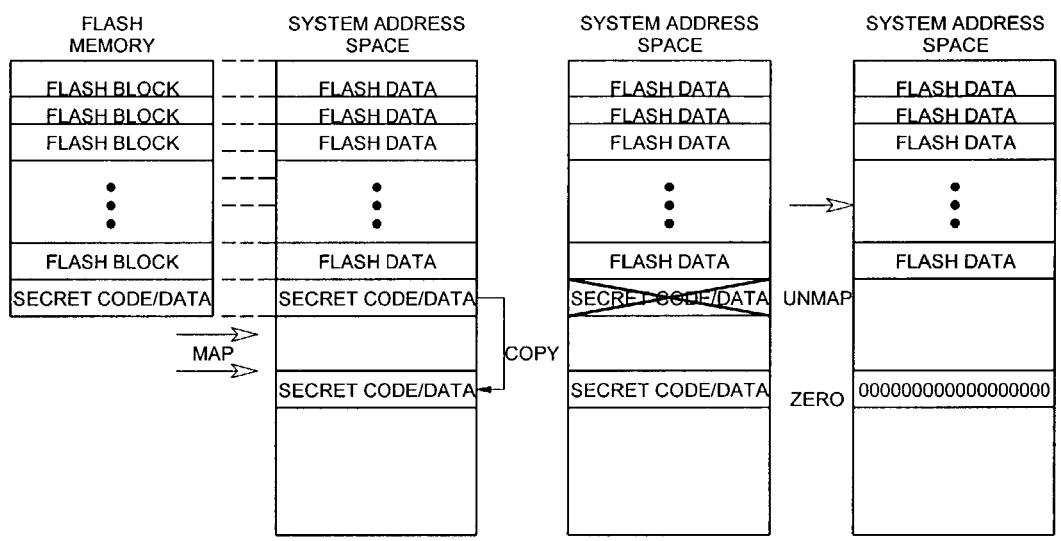
FIG. 6 illustrates a simplified system diagram of memory during the processing of FIG. 5 according to an embodiment of the present invention.

At operation 502, the flash memory may be mapped to the address space of the computing system. This operation is also shown with reference to FIG. 6. In one embodiment, one or more of the blocks of flash memory may be used to store secret code and/or data. At operation 504, the contents of this selected block (e.g., the secret code and/or data) may be copied to a selected area of memory of the computing system as shown in FIG. 6. In one embodiment, the selected block may be considered a first region of memory (i.e., in the flash memory) and the selected area may be considered a second region of memory (e.g., in the main memory or static memory of the computing system). Next, at operation 506, the secret code may be executed and/or the secret data may be extracted/accessed and used from the copied location. In one embodiment, this may involve cryptographic or other security processing by the computing system.

At operation 508, once the secret code and/or data have been used/accessed, virtual locking is effected for selected blocks 208 within flash memory 107 using a programmable technique supported by flash memory 107 (e.g., as in the technique described in FIG. 4). For example, the bits in block locking register 250 can be programmed to lock selected blocks 208 as explained above. In one embodiment, the effect is that the selected block of flash memory containing the secret code and/or data may be unmapped by using the NOT(Read) and NOT(Write) directives to the flash memory as described above with reference to FIGS. 3 and 4.

At operation 510, the memory associated with the used secret code and/or data may be overwritten (e.g., "zeroed out") to obliterate the data stored therein. The code and/or data are then no longer accessible by any process (whether operating system or application program), either in main memory, static memory, or in the flash memory, until another system restart is performed. At operation 512, system processing may be continued. For example, further system initialization tasks may be performed, the operating system may be loaded, application programs may be executed, and so on.

Table I shows one non-limiting example of pseudo-code for providing secret storage in a computing system as described herein. In this example, the secret storage may be used to assist integrity checking of system driver software. In one embodiment, the secret storage may be used to store a cryptographic key (designated Ksecret in this example).

TABLE I

```
© 2003 Intel Corporation
//
// After the system restart. This is the algorithm which may be executed
by the BIOS.
//
// Assume at firmware update/build time, the HMAC_D_STORED
was computed and
// stored in the BLOCKsecret symmetrically-blocked flash part.
//
Begin
    //
    // Get secret data
    //
    Firmware reads Ksecret from Flash block (BLOCKsecret) that will
    be made unreadable
    Firmware has HMAC HMAC_D_STORED for each driver in
    Flash block (BLOCKsecret)
that will be made unreadable
    //
    // Integrity check
    //
    For each driver D in the firmware volume
        //
        // Compute the HMAC
        //    ipad = the byte 0x36 repeated 64 times
        //    opad = the byte 0x5C repeated 64 times.
        //    HMAC_D_COMPUTER = SHA-1(Ksecret XOR opad,
        SHA-1(Ksecret XOR ipad, Driver D binary image))
        //
        Firmware computes HMAC_D_COMPUTED of driver
        //
        // Has the driver been tampered with since build or
        BIOS update time?
        //
        if (HMAC_D_STORED == HMAC_D_COMPUTER)
            //
            // No, there has not been tampering
            //
            set bit-map entry to TRUE for this driver as runnable
        else
            //
            // Yes, there has been tampering
            //
            set bit-map entry to FALSE for this driver as non-runnable
    //
    // Hide secrets
    //
    When computation done, set BLOCKsecret as NOT(READ) and
NOT(WRITE) via feature-space command.
    Erase any intermediate HMAC data from memory.
    //
    // Use resultant information from secrets to invoke drivers
    //
    For each entry in bit-map
        Dispatch associated driver
End
```

Although the operations of FIGS. 4 and 5 may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

Thus, a method and system accessing a block of a flash memory only once per system initialization have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of managing read once flash memory in a computing system comprising:
    mapping the flash memory to an address space of the computing system;
    copying a selected block of at least one of instructions and data from a first region in the flash memory to a second region in a memory of the computing system;
    at least one of executing the instructions and accessing the data from the second region;
    unmapping only the selected block of flash memory; and
    overwriting the second region wherein unmapping the selected block comprises locking the selected block in the flash memory based on the executed instructions such that the selected block is virtually hardware locked.

2. The method of claim 1, wherein unmapping the selected block of flash memory prevents subsequent accesses of the selected block until a machine reset of the computing system is performed.

3. The method of claim 1, wherein the at least one of executing the instructions and accessing the data comprises performing cryptographic operations by the computing system.

4. The method of claim 1, wherein the locking of the selected block in the flash memory includes locking the selected block using a programmable technique.

5. The method of claim 4, wherein the locking of the selected block in the flash memory comprises programming a read lock bit, a write lock bit, and a lock down bit corresponding to the selected block.

6. The method of claim 1, further comprising performing a machine reset of the computing system prior to mapping the flash memory.

7. A computing system comprising:
   a flash memory having a selected block to store at least one of instructions and data, the selected block being capable of being virtually hardware locked; and
   a processor to execute code to map the flash memory to an address space of the computing system, to copy the selected block from a first region in the flash memory to a second region in a memory of the computing system, to at least one of execute the instructions and access the data from the second region, to unmap only the selected block of flash memory, and to overwrite the second region wherein the processor executes code to unmap the selected block by locking the selected block in the flash memory based on the executed instructions such that the selected block is virtually hardware locked.

8. The computing system of claim 7, wherein the processor executes code to unmap the selected block of flash memory thereby preventing subsequent accesses of the selected block until a machine reset of the computing system is performed.

9. The computing system of claim 7, wherein the processor at least one of executes the instructions and accesses the data to perform cryptographic operations for the computing system.

10. The computing system of claim 7, wherein the locking of the selected block in the flash memory includes locking the selected block using a programmable technique.

11. The computing system of claim 8, wherein the locking of the selected block in the flash memory comprises programming a read lock bit, a write lock bit, and a lock down bit corresponding to the selected block.

12. The computing system of claim 7, wherein the computing system performs a machine reset prior to the processor executing code to map the flash memory.

13. A computer-readable medium providing instructions, which if executed by a processor of a computing system, causes the processor to perform operations comprising:
   mapping a flash memory to an address space of the computing system;
   copying a selected block of at least one of instructions and data from a first region in the flash memory to a second region in a memory of the computing system;
   at least one of executing the instructions and accessing the data from the second region;
   unmapping only the selected block of flash memory; and
   overwriting the second region wherein operations for unmapping the selected block comprises operations for locking the selected block in the flash memory based on the executed instructions such that the selected block is virtually hardware locked.

14. The article of claim 13, wherein operations for unmapping the selected block of flash memory prevents subsequent accesses of the selected block until a machine reset of the computing system is performed.

15. The article of claim 13, wherein the at least one of executing the instructions and accessing the data comprises performing cryptographic operations by the computing system.

16. The article of claim 13, wherein operations for the locking of the selected block in the flash memory include operations for locking the selected block using a programmable technique.

17. The article of claim 16, wherein operations for the locking of the selected block in the flash memory comprises programming a read lock bit, a write lock bit, and a lock down bit corresponding to the selected block.

* * * * *